United States Patent

Kim et al.

[11] Patent Number: 5,790,210
[45] Date of Patent: Aug. 4, 1998

[54] APPARATUS AND METHOD FOR DIGITAL CONVERGENCE CORRECTION

[75] Inventors: Jin-goo Kim; Chae-gon Oh, both of Suwon, Rep. of Korea

[73] Assignee: Samsung Electronics Co., Ltd., Kyungki-do, Rep. of Korea

[21] Appl. No.: 620,325

[22] Filed: Mar. 22, 1996

[30] Foreign Application Priority Data

Mar. 24, 1995 [KR] Rep. of Korea ............ 1995 6488
Mar. 24, 1995 [KR] Rep. of Korea ............ 1995 6489
Mar. 24, 1995 [KR] Rep. of Korea ............ 1995 6490

[51] Int. Cl.$^6$ ........................................ H04N 9/28
[52] U.S. Cl. ............. 348/807; 348/806; 315/368.13; 315/368.12
[58] Field of Search ........................ 348/806, 807, 348/745, 746, 747; 315/368.11, 368.12, 368.13, 368.23; H04N 9/28

[56] References Cited

U.S. PATENT DOCUMENTS

| | | | |
|---|---|---|---|
| 5,260,797 | 11/1993 | Muraji et al. | 348/745 |
| 5,298,985 | 3/1994 | Tsujihara et al. | 348/745 |
| 5,345,280 | 9/1994 | Kimura et al. | 348/746 |
| 5,463,427 | 10/1995 | Kawashima | 348/806 |
| 5,565,744 | 10/1996 | Teuling et al. | 315/368.23 |
| 5,694,181 | 12/1997 | Oh | 348/807 |

*Primary Examiner*—Michael Lee
*Attorney, Agent, or Firm*—Sughrue, Mion, Zinn, Macpeak & Seas, PLLC

[57] ABSTRACT

Among the total sampling points for digital convergence, a portion are selected as seed points. Correction data of each of the selected seed points is efficiently stored in a first memory. The correction data of the sampling points which are not stored is interpolated using operation values. The operation values for the interpolation operation are stored ahead of time in a look-up table. Thus, rather than using dedicated calculating circuits for performing an interpolation operation, hardware is simplified and operation speed is enhanced.

10 Claims, 7 Drawing Sheets

APPARATUS AND METHOD FOR DIGITAL CONVERGENCE CORRECTION

BACKGROUND OF THE INVENTION

The present invention relates to a digital convergence correction apparatus and a method thereof. More particularly, it relates to a method and an apparatus for efficiently storing digital convergence correction data of a predetermined number of seed points and interpolating correction data which is not stored data.

A convergence correction function applied to a projection TV, etc., in which beams are projected onto a display screen using red (R), green (G) and blue (B) CRTs (cathode ray tubes) to form a single image, is to correct convergence of the beams emitted from the R, G and B CRTs throughout an entire scanning surface so that images of R, G and B are completely overlapped on the display screen.

A digital convergence correction method currently employed is as follows: 16 sampling points are preset at a predetermined interval in a single horizontal line, as shown in FIG. 1, and the sampling points of the entire screen are stored in a memory. During the beam projection, the stored correction data of the sampling points is read out, and only R, G or B data of a particular sampling point which is not focused are adjusted.

The correction data of each sampling point consists of 9 bits for R-H, 10 bits for G-H, 9 bits for B-H, 12 bits for R-V, 12 bits for G-V and 12 bits for B-V. Thus, the size of the correction data of each sampling point is 64 bits, i.e., 8 bytes.

Every 64-bits of correction data (for each sampling point) is sequentially stored in a 12-byte memory as shown in FIG. 2. Eight bits of the 9-bit R-H data are stored in an 8-bit memory area 11 and the remaining one bit data is stored in a next memory area 12. Next, 8 bits of the 10-bit G-H data are stored in another memory area 13 and the remaining 2-bit data is stored in a next memory area 14. Similarly, data of the B-H (9 bits), the R-V (12 bits), the G-V (12 bits) and the B-V (12 bits) are sequentially stored in memory areas 15 to 22. Thus, to store the correction data of the total 64-bit (8 bytes) corresponding to a single sampling point, 12-bytes of memory area (bytes 11 to 22) are required.

FIG. 3 shows a block diagram of a conventional digital convergence correction apparatus.

In FIG. 3, the correction data of sampling points with respect to an entire single screen is stored in a memory 110. Since one correction data consists of 64 bits and a 12-byte memory is required for storing the correction data in an 8-bit memory as shown in FIG. 2, a memory size of 192 bytes (12×16) is required to store the total correction data of one horizontal line. Further, since the number of horizontal lines in one screen is 262.5, a memory size of 50390 bytes (192 bytes×262.5) is required to store the correction data with respect to the entire one screen. Thus, a memory of 512 kilobytes is required to store the total correction data corresponding to one screen. An EPROM is usually used for the memory 110.

Data separation circuit 120 reads out the total correction data of an entire screen stored in memory 110, separates the correction data of each sampling points into the R-H (9 bits), the G-H (10 bits), the B-H (9 bits), the R-V (12 bits), the G-V (12 bits) and the B-V (12 bits), and adjusts the correction data of particular sampling points where the convergence does not match. For instance, if the correction data for R of the third sampling points in the 200th horizontal line is deviated in horizontal and vertical directions, just a correction with respect to the R will be enough. That is, when R-H and R-V are 110000011 and 000000011110, respectively, though the R-H and the R-V should be 110001111 and 000000011000, respectively, correction of the R-H and the R-V to 110001111 and 000000011000, respectively, is enough.

The correction data from the data separation circuit 120 is converted into an analog signal in a digital-to-analog converter 130, and is applied to a convergence yoke 141 to perform digital convergence. Here, the analog signal output from D/A converter 130 works as a current signal driving convergence yoke 141.

However, a memory of large capacity is required in the above-mentioned correction apparatus since the correction data of all the sampling points for a single screen is stored.

Thus, to clear up such a problem it has been common to select particular seed points among the sampling points of an entire screen and to store only correction data of the seed points in a memory.

FIG. 4 shows an example of selecting the seed points. Sixteen sampling points are set and stored as seed points during a period of one horizontal line (1H). In a vertical direction where 256 lines constitutes one screen, the sampling points of five lines (every 64 lines) are selected and stored as the seed points, and sampling points of the remaining vertical lines are calculated by interpolation.

FIG. 5 shows another example of selecting the seed points. Not all of the correction data of the 16 sampling points during the 1H period are stored. Instead, five sampling points among the 16 sampling points are selected as seed points. On the other hand, five horizontal lines are selected in the vertical direction. Then, only the correction data of seed points of selected horizontal lines is stored.

To be more specific, 3rd, 6th, 9th, 12th and 15th sampling points among the 16 sampling points are selected as the seed points with respect to the 1H. The number of lines vertically constituting one screen is set to be 256 instead of 262.5, and five lines every 64 lines are selected and seed points of the selected lines are stored, thus sharply reducing a memory size. That is, 25 seed points comprising a lattice are selected as the sampling points of one screen and only correction data of the selected seed points is stored in the memory.

FIG. 6 shows a curve linking each seed point for explaining the principle of interpolating correction data of the sampling points which are not selected by using correction data of the five seed points as shown in FIG. 4.

By calculating a continuous curve which links the 5 seed points, correction data of the other sampling points not selected can be obtained.

As an interpolation equation for obtaining the continuous curve, a following Lagrange equation can be employed.

$$y_x = P_0 \left[ \frac{(x-m1)(x-m2)(x-m3)(x-m4)}{(m0-m1)(m0-m2)(m0-m3)(m0-m4)} \right] + \quad (1)$$

$$P_1 \left[ \frac{(x-m0)(x-m2)(x-m3)(x-m4)}{(m1-m0)(m1-m2)(m1-m3)(m1-m4)} \right] +$$

$$P_2 \left[ \frac{(x-m0)(x-m1)(x-m3)(x-m4)}{(m2-m0)(m2-m1)(m2-m3)(m2-m4)} \right] +$$

$$P_3 \left[ \frac{(x-m0)(x-m1)(x-m2)(x-m4)}{(m3-m0)(m3-m1)(m3-m2)(m3-m4)} \right] +$$

$$P_4 \left[ \frac{(x-m0)(x-m1)(x-m2)(x-m3)}{(m4-m0)(m4-m1)(m4-m2)(m4-m3)} \right]$$

When the correction data of five seed points $P_0$ to $P_4$ are given, the correction data of the sampling points between the seed points can be easily interpolated by setting the five seed points as poles in this equation.

Here, when $m0=1$, $m1=64$, $m2=128$, $m3=192$ and $m4=256$, equation (1) becomes:

$$y_x = P_0 \left[ \frac{(x-64)(x-128)(x-192)(x-256)}{(1-64)(1-128)(1-192)(1-256)} \right] +$$

$$P_1 \left[ \frac{(x-1)(x-128)(x-192)(x-256)}{(64-1)(64-128)(64-192)(64-256)} \right] +$$

$$P_2 \left[ \frac{(x-1)(x-64)(x-192)(x-256)}{(128-1)(128-64)(128-192)(128-256)} \right] +$$

$$P_3 \left[ \frac{(x-1)(x-64)(x-128)(x-256)}{(192-1)(192-64)(192-128)(192-256)} \right] +$$

$$P_4 \left[ \frac{(x-1)(x-64)(x-128)(x-192)}{(256-1)(256-64)(256-128)(256-192)} \right]$$

where, $P_0$–$P_4$ are correction data of the seed points and "x" varies from 1 to 256, which is the number of horizontal lines scanned during one vertical line period (V).

Equation (1) can be expressed as a following form.

$$y_x = \sum_{i=0}^{4} P_i(a_i x^4 + b_i x^3 + c_i x^2 + d_i x + e_i) \quad (2)$$

$$= P_0(a_0 x^4 + b_0 x^3 + c_0 x^2 + d_0 x + e_0) +$$

$$P_1(a_1 x^4 + b_1 x^3 + c_1 x^2 + d_1 x + e_1) +$$

$$P_2(a_2 x^4 + b_2 x^3 + c_2 x^2 + d_2 x + e_2) +$$

$$P_3(a_3 x^4 + b_3 x^3 + c_3 x^2 + d_3 x + e_3) +$$

$$P_4(a_4 x^4 + b_4 x^3 + c_4 x^2 + d_4 x + e_4)$$

where, $a_i$, $b_i$, $c_i$, $d_i$ and $e_i$, are constants related with the number of horizontal lines where five seed points are set.

Likewise, as shown in FIG. 5, equation (1) is also applied to a horizontal interpolation where the non-selected sampling point is interpolated by using five seed points as shown in FIG. 5. In this case, however, "x" varies from 1 to 16, which is the number of sampling points scanned during one horizontal period (H) and m0, m1, m2, m3 and m4 are the number of sampling points in a horizontal direction, i.e., 3, 6, 9, 12 and 15, respectively. The $a_i$, $b_i$, $c_i$, $d_i$ and $e_i$ are constants with respect to each of predetermined-numbered (3rd, 6th, 9th, 12th and 15th) seed points.

A hardware structure for implementing such interpolation formula is shown in FIG. 7. The hardware comprises operators 151.1–151.5 for performing operation $a_i x^4 + b_i x^3 + c_i x^2 + d_i x + e_i$ for a sampling point, multipliers 152.1–152.5 for multiplying each operation result of operators 151.1–151.5 by each correction data values $P_0$–$P_4$ of seed points, respectively, and a summing circuit 153 for summing all the multiplied result of multipliers 152.1–152.5.

However, in the interpolation circuit shown in FIG. 7 for implementing equation (1) is complex in hardware due to operators 151.1–151.5 each of which consists of a number of logic circuits for performing the particular operation $a_1 x^4 + b_1 x^3 + c_1 x^2 + d_1 x + e_1$, and thus lowering the operation speed.

Also, the memory for storing the correction data is inefficiently used in the conventional correction apparatus, since 12 bytes of memory is required when correction data of a single sampling point consisting of 64 bits is stored in an 8-bit memory.

SUMMARY OF THE INVENTION

To solve the above problems, it is an object of the present invention to provide a digital convergence correction apparatus in which correction data of predetermined-numbered seed points is efficiently stored without unused memory space.

It is another object of the present invention to provide the apparatus which uses simpler hardware for interpolating the remaining sampling points which are not stored.

It is still another object of the present invention to provide a digital convergence correction method which can interpolate the remaining sampling points which are not stored and are interpolated by reading out the stored sampling points at a high speed.

Accordingly, to achieve the above objects, there is provided a digital convergence correction apparatus using correction data of sampling points set at a predetermined interval on a screen, the correction apparatus comprising: a first memory for storing correction data of selected seed points, said seed points being a predetermined number of sampling points selected among sampling points of one entire screen; a second memory for storing operation values for read out which are calculated according to a predetermined interpolation equation and are previously stored by a predetermined number of horizontal lines during one vertical line period and a predetermined number of sampling points during one horizontal line period; a plurality of multipliers for reading out the operation values from said second memory using the number of a sampling point during the one horizontal line period as an address and multiplying the read-out operation values by each correction data of the seed points in a horizontal direction, respectively, in a horizontal interpolation, and for reading out the operation values from said second memory using the number of a horizontal line during the one vertical line period as an address and multiplying the read-out operation values by each correction data of the seed points in a vertical direction, respectively, in a vertical interpolation; a summing circuit for summing each multiplying result of said plurality of multipliers; and driving means for generating a driving signal for correcting convergence of a cathode ray tube using an output of said summing circuit.

To achieve the above objects, there is provided a method of correcting digital convergence using correction data of sampling points set at a predetermined interval on a screen, the correction method comprising the steps of: (a) selecting a predetermined number of sampling points as seed points among the sampling points of the entire screen; (b) reading out an operation value calculated according to a predetermined interpolation equation which was previously stored by a predetermined number of horizontal lines during one vertical line period and a predetermined number of sampling points during one horizontal line period; (c) multiplying the operation value read out in said step (b) by correction data of the seed points selected in said step (a) to produce multiplied results; (d) interpolating by summing the multiplied results to produce interpolated correction data; and (e) generating a driving signal for correcting convergence of a cathode ray tube using the interpolated correction data.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
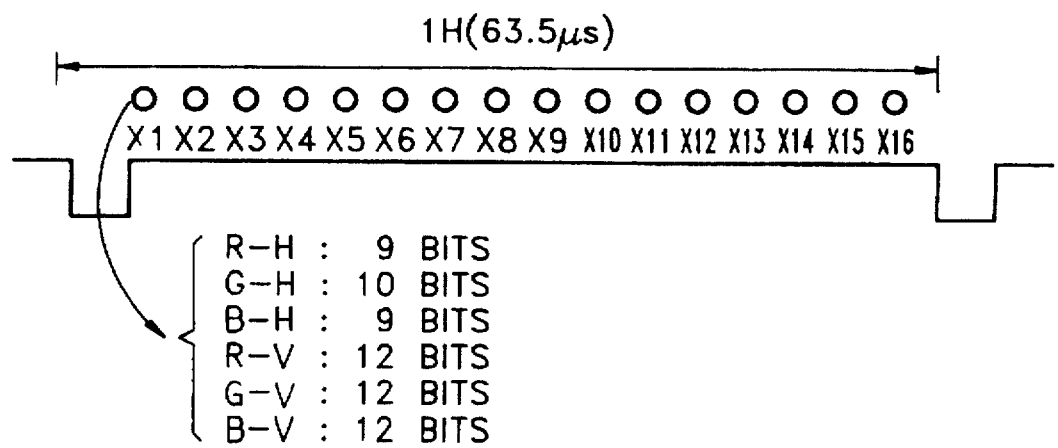
FIG. 1 is a view illustrating the sampling points of one horizontal line and the data structure in a digital convergence correction.
Figure 2:
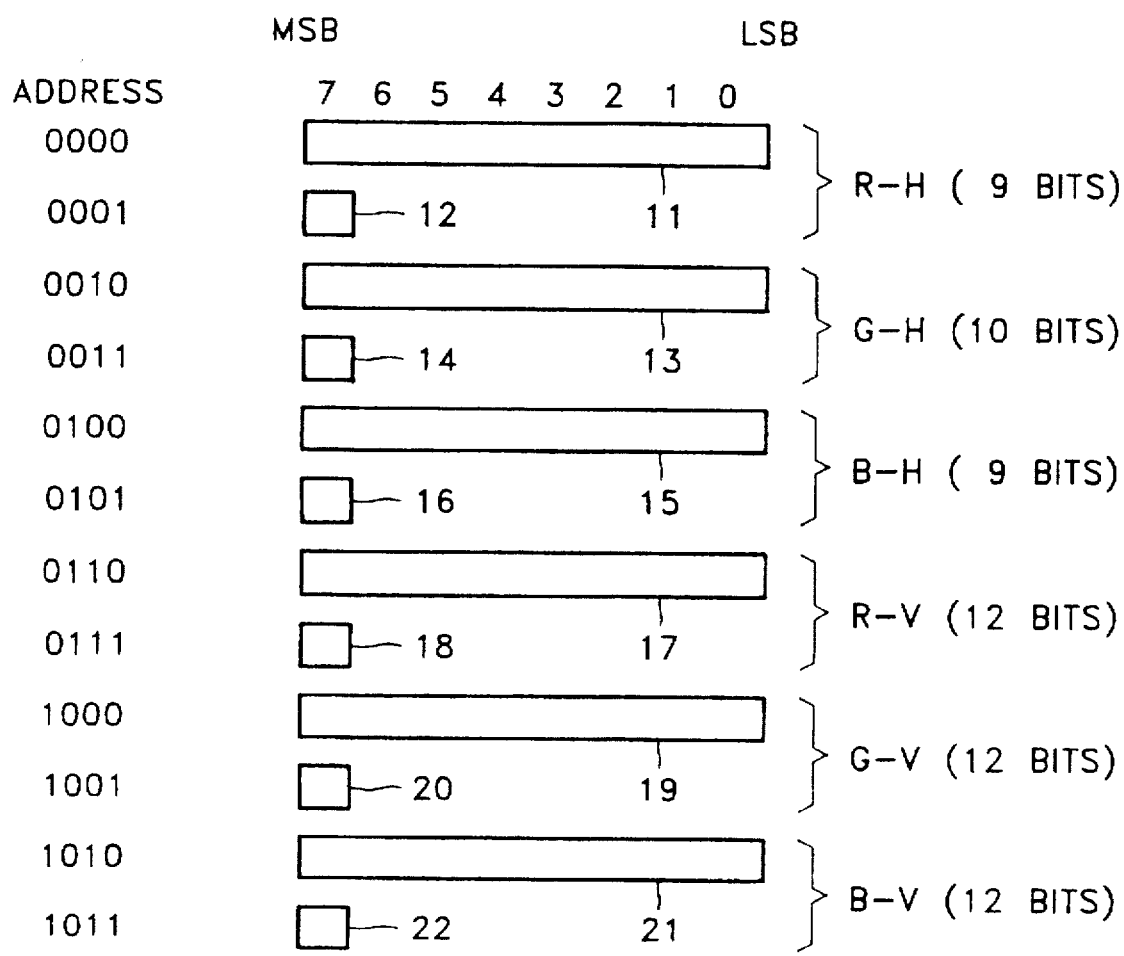
FIG. 2 is a diagram showing a state where conventional digital convergence correction data is stored in a memory.
Figure 3:
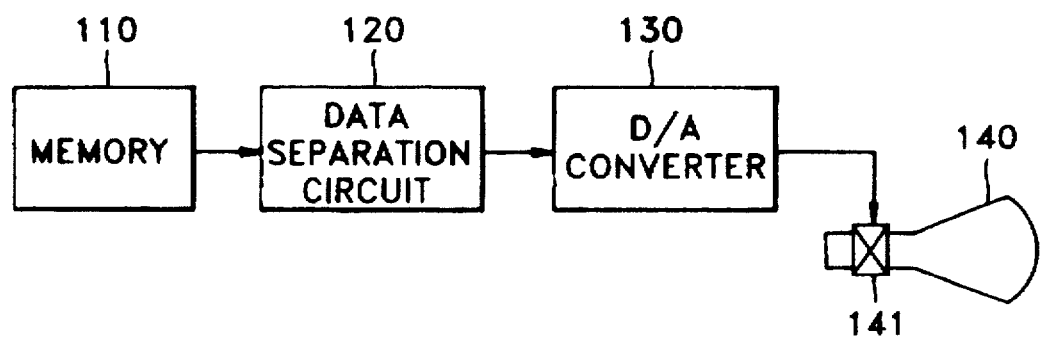
FIG. 3 is a block diagram illustrating a conventional digital convergence correction apparatus.
Figure 8:
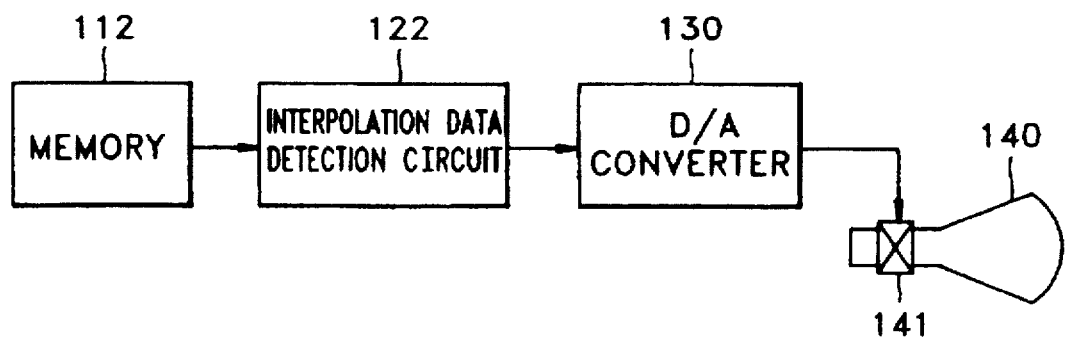
FIG. 8 is a block diagram illustrating a digital convergence correction apparatus according to the present invention.

FIG. 8 shows a structure of a digital convergence correction apparatus according to the present invention. Components of the structure which are the same as those shown in FIG. 3 have the same reference numerals.

Figure 4:
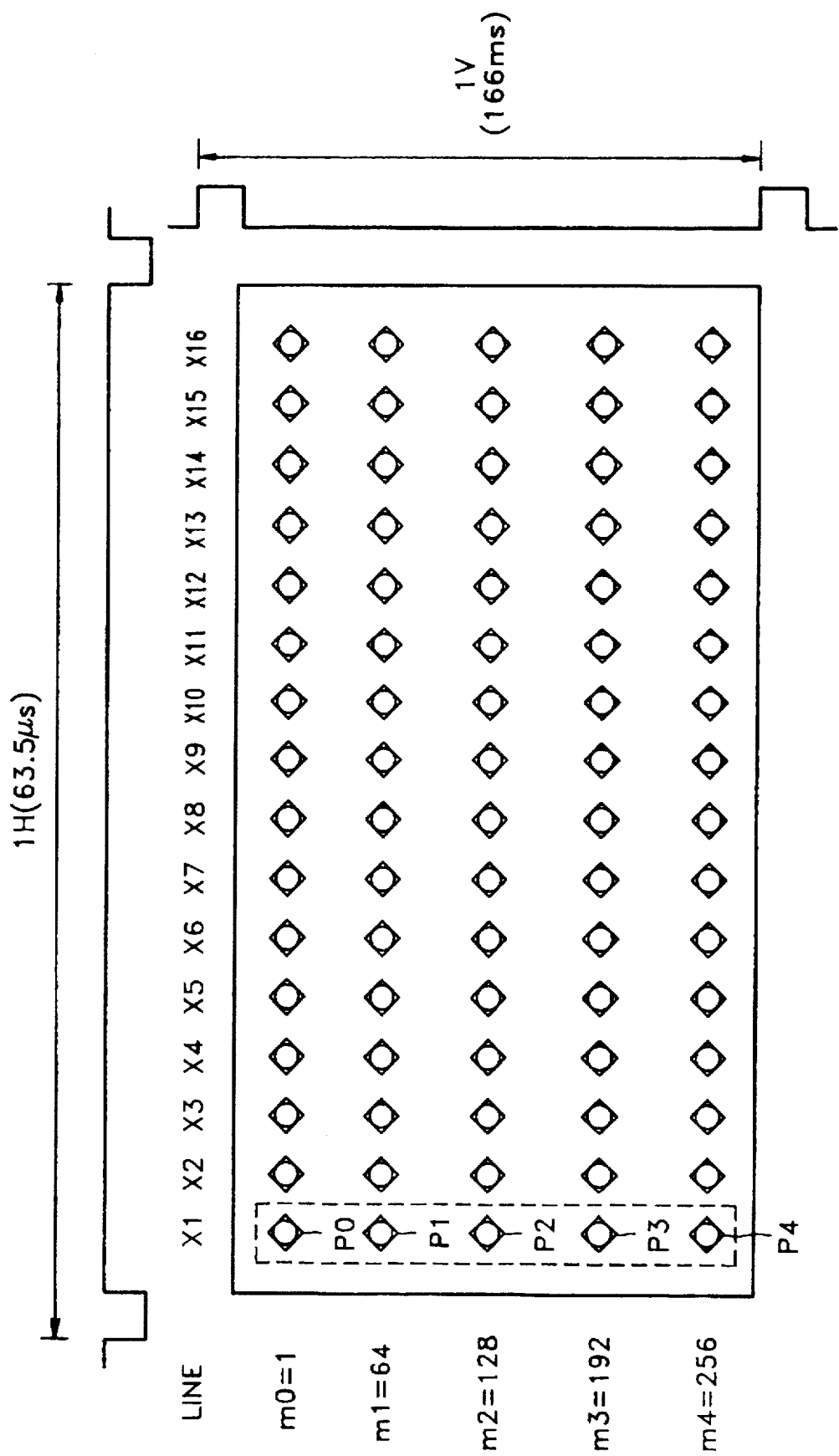
FIG. 4 is a view illustrating an example of selecting seed points.
Figure 5:
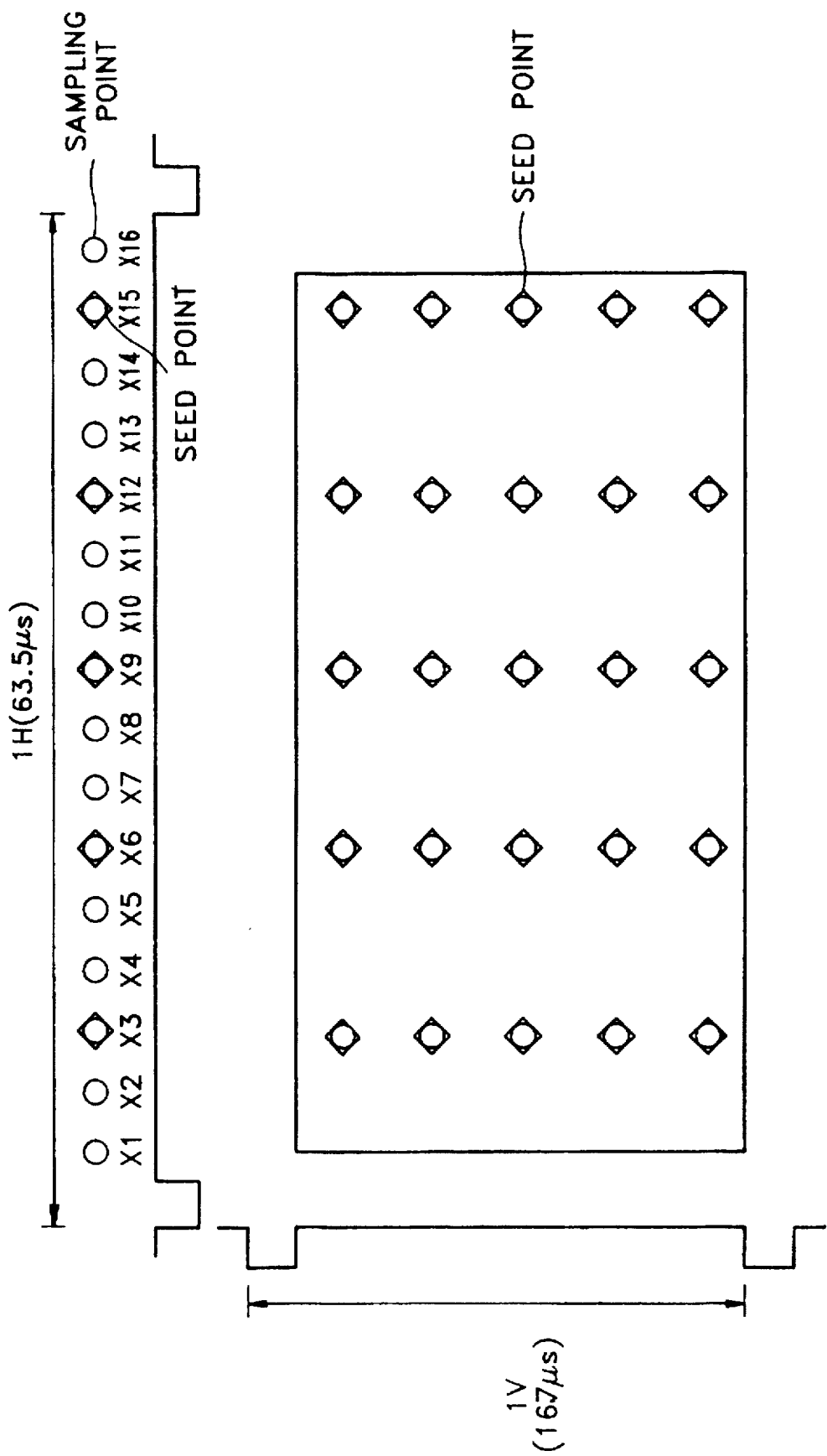
FIG. 5 is a view illustrating another example of selecting seed points.
Figure 6:
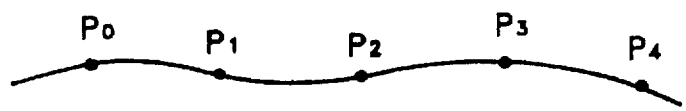
FIG. 6 is a view for explaining the principle of interpolating correction data of the sample points which are not selected.

In a memory 112 in FIG. 8, correction data of only predetermined-numbered seed points at predetermined positions among the correction data of all the sampling points is stored, as shown in FIGS. 4 or 5.

Here, the correction data of the selected each seed point is composed of R-H (9 bits), G-H (10 bits), B-H (9 bits), R-V (12 bits), G-V (12 bits) and B-V (12 bits), a total of 64 bits or 8 bytes. Thus, the correction data of each seed point is stored in first to eighth 8-bit memory areas 161 to 168 as shown in FIG. 9.

Figure 9:
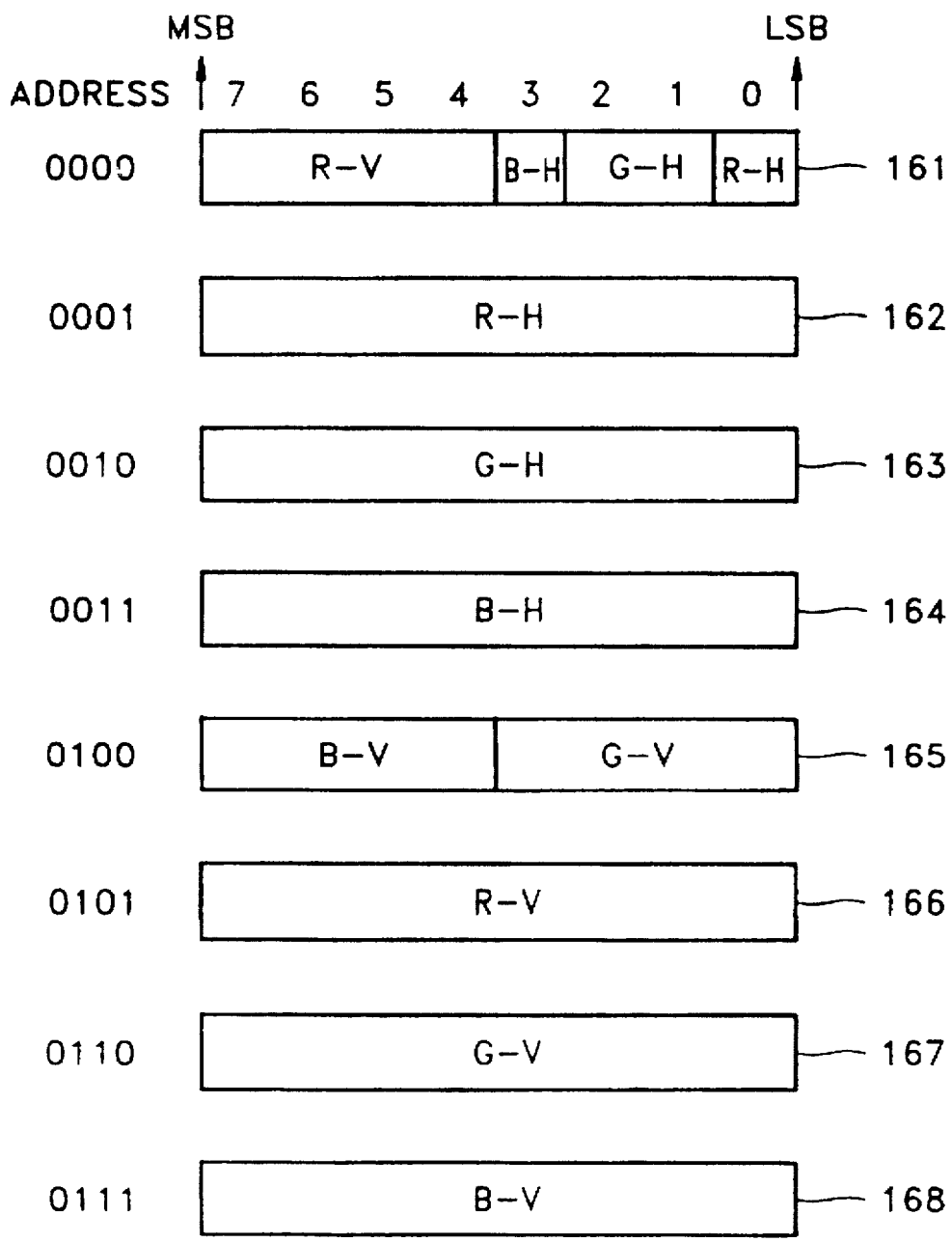
FIG. 9 is a view showing a state where correction data of the seed point is stored in a memory.

In FIG. 9, 8 bits of the 9-bit R-H data are stored in a second memory area 162 and the remaining 1-bit data is stored in a first memory area 161; 8 bits of 10-bit G-H data are stored in a third memory area 163 and the remaining 2-bit data is stored in first memory area 161; 8 bits of 9-bit B-H data are stored in a fourth memory area 164 and the remaining 1-bit data is stored in first memory area 161; 8 bits of 12-bit R-V data are stored in a sixth memory area 166 and the remaining 4-bit data is stored in first memory area 161; 8 bits of 12-bit G-V data are stored in a seventh memory area 167 and the remaining 4-bit data is stored in fifth memory area 165; and 8 bits of 12-bit B-V data are stored in an eighth memory area 168 and the remaining 4-bit data is stored in fifth memory area 165. The stored data can be read out in a reverse sequence of the above correction-data storing manner. Here, first to eighth memory areas 161–168 are included in a memory 112 shown in FIG. 8.

As above, since the correction data of the seed points are stored in memory 112 not in sequence but being mixed, only an 8-byte memory is needed compared with the 12-byte memory required in the conventional technology for storing the correction data of one sampling point, thus considerably saving memory capacity.

If the correction data of 16 seed points in a horizontal line are stored in memory 112 with respect to the selected five vertical lines, as shown in FIG. 4, without unused space in the memory as shown in FIG. 9, a memory of 5×16×64= 5120 bits (i.e., 640 bytes) size is required.

If the 64-bit correction data of each seed point is stored in memory 112 by selecting as a seed point a total of 25 sampling points, i.e., 5 in a vertical direction by 5 in a horizontal direction, as shown in FIG. 5, a memory of 5×5×64=1600 bits (or 200 bytes) size is needed.

Compared with a 512 kilobyte memory which has been previously required, a memory of only 200 bytes size is needed to store the digital convergence correction data in the present invention. Thus, the memory size is sharply reduced. Using an E²PROM as memory 112 facilitates data reading-out/writing relatively to using an EPROM.

An interpolation data detection circuit 122 is for reading out the correction data of seed points stored in memory 112 and calculating correction data of the remaining sampling points which are not stored using the interpolation equation (here, Lagrange equation). If the correction data stored in memory 112 is the correction data of seed points as shown in FIG. 4, the correction data of sampling points in each scanning line other than the five seed point lines is calculated based upon correction data of five seed point lines in a vertical direction. On the other hand, if the correction data stored in memory 112 is the correction data of seed points as shown in FIG. 5, correction data of the 16 sampling points other than the five seed points of each line is calculated based upon the correction data of five seed points in a horizontal direction, and correction data with respect to sampling points of 256 lines is calculated to detect interpolation data using the correction data of five seed points in a vertical direction. After each interpolation data is calculated, only correction data of a particular sampling points where convergence becomes deviated is adjusted.

The correction data detected from interpolation detection circuit 122 is applied to a convergence yoke 141 via a digital-to-analog converter 130 to thereby perform digital convergence. Here, an analog signal output from D/A converter 130 is a form of a current signal for driving convergence yoke 141. Accordingly, D/A converter 130 can be referred to as a driving means for supplying a driving signal for driving convergence yoke 141 of a CRT 140.

Next, a vertical interpolation using the vertical 5 seed points to interpolate 256 sampling points as shown in FIG. 4 will now be described in an example with respect to interpolation data detection circuit 122 of FIG. 8.

Figure 7:
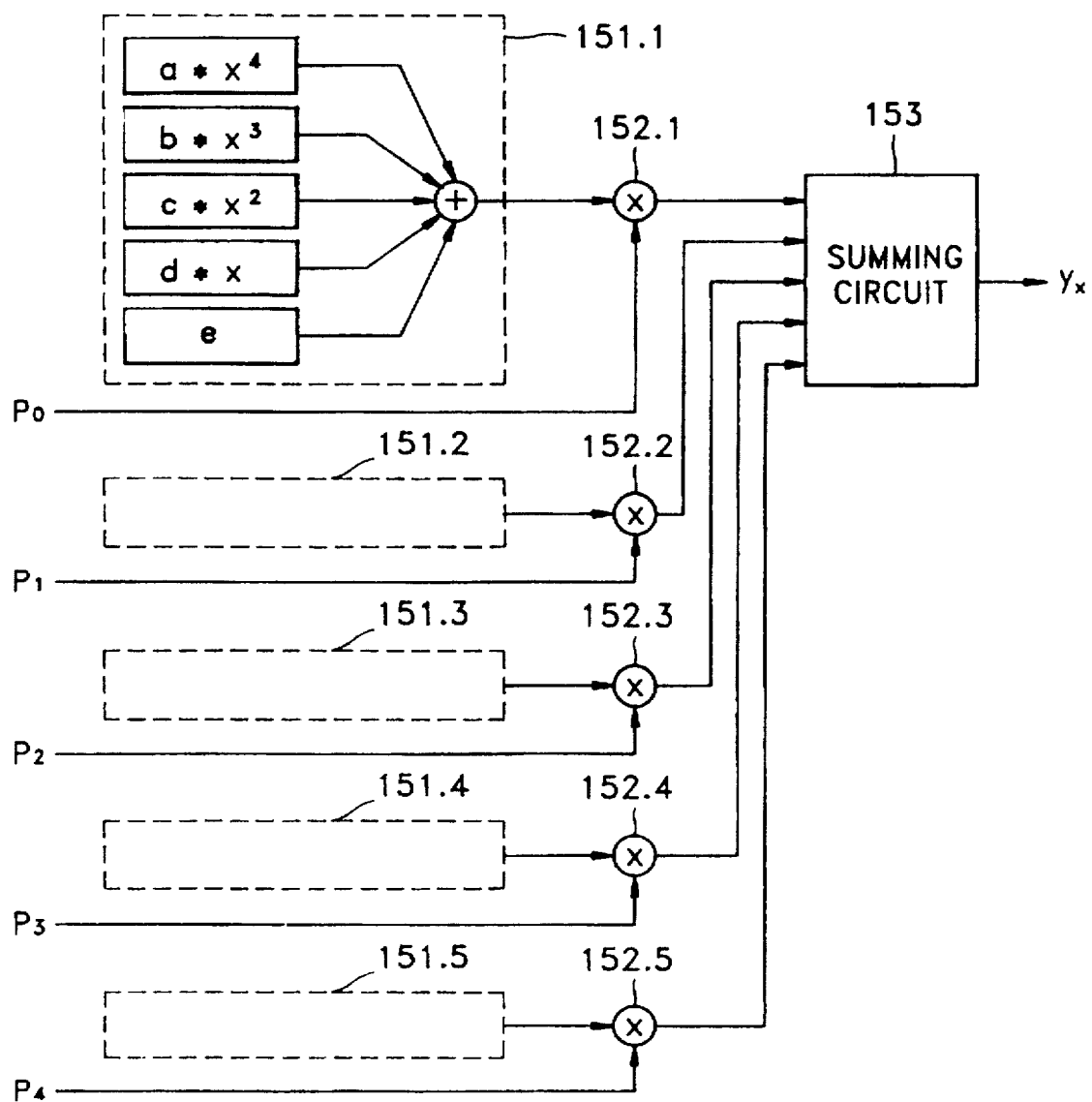
FIG. 7 is a detailed circuit diagram of an interpolation circuit where the interpolation principle of FIG. 6 is implemented.
Figure 10:
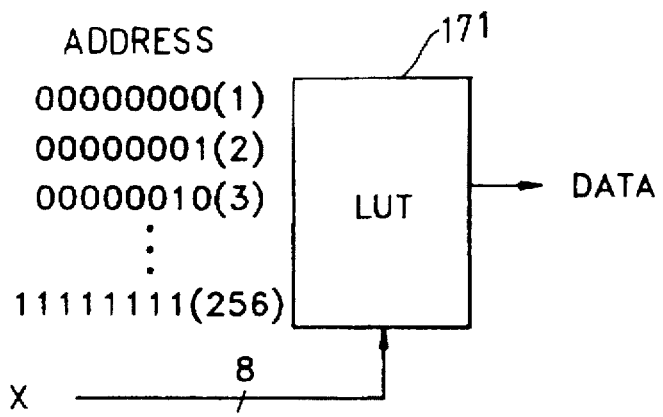
FIG. 10 is a diagram of an interpolation implementation according to the present invention with a look-up table.

In interpolation data detection circuit, an operator for operating $a_i x^4 + b_i x^3 + c_i x^2 + d_i x + e_i$ occupies the largest space in the hardware, and the operation takes long time. Accordingly, if the operation results calculated in advance are stored in a look-up table 171 as shown in FIG. 10 to be read out for interpolation calculation, no additional sophisticated operator is required like in the hardware shown in FIG. 7. The operation value previously stored in the look-up table 171 can be read out using "x" value as an address.

Figure 11:
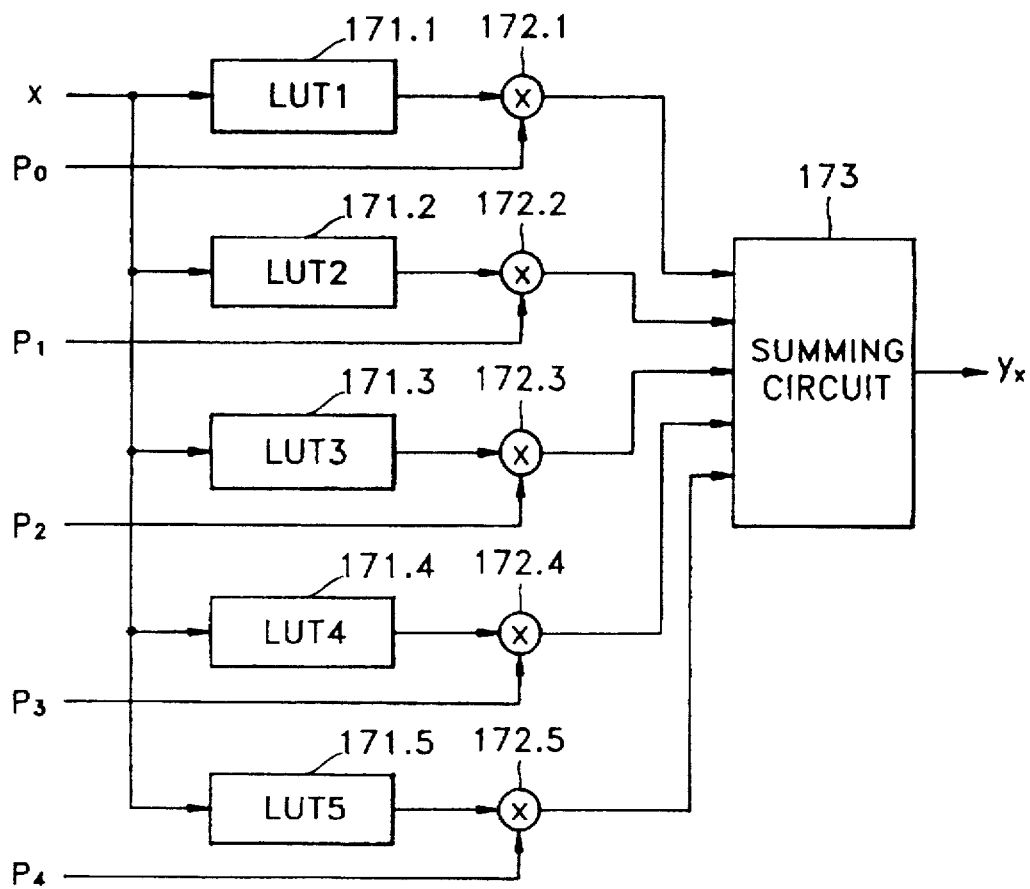
FIG. 11 is a detailed circuit diagram of an interpolation data detection circuit using the look-up table shown in FIG. 10.

A detailed circuit diagram of interpolation data detection circuit 122 using look-up table 171 is shown in FIG. 11.

In FIG. 11, interpolation data detection circuit 122 comprises a plurality of look-up tables 171.1-171.5 where the operation results of $a_ix^4+b_ix^3+c_ix^2+d_ix+e_i$ are stored by horizontal line(s) and seed point(s) as many as the number corresponding to one vertical line period, a plurality of multipliers 172.1-172.5 for multiplying the operation results read out from look-up tables 171.1-171.5 by correction data of seed points $P_0-P_4$ in a vertical direction, respectively, and a summing circuit 173 for summing the multiplied results of multipliers 172.1-172.5, thus to interpolate sampling points which are not selected. Here, the look-up table can be a single look-up table having a plurality of areas where the plurality of operation results from x=1 to x=256 are stored by a seed point. Thus, by reading out the operation results stored in look-up tables 171.1-171.5 using "x" as an address, operation time can be sharply reduced and the hardware can be simplified.

Further, as shown in FIG. 5, in cases of the horizontal interpolation where interpolation is made with 16 sampling points using the correction data of five seed points in a horizontal direction and the vertical interpolation where interpolation is made with sampling points of 256 lines using the correction data of five seed points in a vertical direction, the operation values are previously stored in look-up tables 171.1-171.5 shown in FIG. 11 by a predetermined number (here, 1-256) of horizontal lines during one vertical line period and a predetermined number (here, 1-16) of sampling points during one horizontal line period. Input "x" varies from 1 to 16 for a horizontal interpolation, and from 1 to 256 for a vertical one.

Though the Lagrange equation is employed as an interpolation data detection equation, other equation can also be employed in the present invention.

As described above, the digital convergence correction apparatus according to the present invention closely packs the correction data of each sampling point in the memory instead of sequentially storing. Accordingly, no unused space is left in the memory. Thus, compared with a memory of 12 bytes previously required to store correction data of one sampling point, a memory of 8 bytes is needed for that in the present invention, thus considerably saving memory capacity. Therefore, it is possible to store the correction data of the sampling points for digital convergence in a small memory space.

Also, since the correction data of only a part of sampling points among the total sampling points for digital convergence are selected as seed points and stored, and the correction data of the sampling points which are not stored is calculated by interpolation, the memory size for storing the digital convergence correction data is considerably reduced.

In addition, the present invention implements the interpolation using the look-up table, thus simplifying a hardware structure and increasing operation speed.

What is claimed is:

1. A digital convergence correction apparatus using correction data of sampling points set at a predetermined interval on a screen, said correction apparatus comprising:

a first memory for storing correction data of selected seed points, said seed points being a predetermined number of sampling points selected among sampling points of one entire screen;

a second memory for storing operation values for read out which are calculated according to a predetermined interpolation equation and are previously stored by a predetermined number of horizontal lines during one vertical line period and a predetermined number of sampling points during one horizontal line period;

a plurality of multipliers for reading out the operation values from said second memory using the number of a sampling point during the one horizontal line period as an address and multiplying the read-out operation values by each correction data of the seed points in a horizontal direction, respectively, in a horizontal interpolation, and for reading out the operation values from said second memory using the number of a horizontal line during the one vertical line period as an address and multiplying the read-out operation values by each correction data of the seed points in a vertical direction, respectively, in a vertical interpolation;

a summing circuit for summing each multiplying result of said plurality of multipliers; and driving means for generating a driving signal for correcting convergence of a cathode ray tube using an output of said summing circuit.

2. The digital convergence correction apparatus as claimed in claim 1, wherein said second memory is a look-up table, and the operation values which have been stored in said look-up table are according to calculation equation $a_ix^4+b_ix^3+c_ix^2+d_ix+e_i$, where, in the case of said horizontal interpolation, "x" varies from 1 to a sampling point number during one horizontal line period, in the case of said vertical interpolation, "x" varies from 1 to a horizontal line number scanned during one vertical line period, and $a_i$, $b_i$, $c_i$, $d_i$ and $e_i$ are constants with respect to each of the horizontal lines where each seed point is set.

3. The digital convergence correction apparatus as claimed in claim 1, wherein sampling points having horizontally and vertically equal intervals are selected as the seed points among the total sampling points, and data with respect to horizontal and vertical components of R, G and B constituting correction data of each selected seed point is stored in bytes of said first memory, filling said first memory leaving no unused space in the bytes.

4. The digital convergence correction apparatus as claimed in claim 1, wherein sampling points of a predetermined horizontal line number are selected as the seed points in a vertical direction, and data with respect to horizontal and vertical components of R, G and B constituting correction data of each selected seed point is stored in bytes of said first memory, filling the bytes while leaving no unused space.

5. The digital convergence correction apparatus as claimed in claim 1, wherein said first memory has portions allocated to store each seed point, each of said portions having a size of 8 bytes and having first to eighth memory areas each being 1 byte.

6. The digital convergence correction apparatus as claimed in claim 5, wherein 8 bits of the 9-bit R-H data are stored in said second memory area and the remaining 1-bit data is stored in said first memory area; 8 bits of 10-bit G-H data are stored in said third memory area and said remaining 2-bit data is stored in said first memory area; 8 bits of 9-bit B-H data are stored in said fourth memory area and the remaining 1-bit data is stored in said first memory area; 8 bits of 12-bit R-V data are stored in said sixth memory area and the remaining 4-bit data is stored in said first memory area; 8 bits of 12-bit G-V data are stored in said seventh memory area and the remaining 4-bit data is stored in said fifth memory area; and 8 bits of 12-bit B-V data are stored in said eighth memory area and the remaining 4-bit data is stored in said fifth memory area.

7. A method of correcting digital convergence using correction data of sampling points set at a predetermined interval on a screen, said correction method comprising the steps of:

(a) selecting a predetermined number of sampling points as seed points among the sampling points of the entire screen;

(b) reading out an operation value calculated according to a predetermined interpolation equation which was previously stored by a predetermined number of horizontal lines during one vertical line period and a predetermined number of sampling points during one horizontal line period;

(c) multiplying the operation value read out in said step (b) by correction data of the seed points selected in said step (a) to produce multiplied results;

(d) interpolating by summing the multiplied results to produce interpolated correction data; and (e) generating a driving signal for correcting convergence of a cathode ray tube using the interpolated correction data.

8. The method of correcting digital convergence as claimed in claim 7, wherein, in said step (b), the previously stored operation value is calculated according to the calculation equation $a_i x^4 + b_i x^3 + c_i x^2 + d_i x + e_i$, where, in the case of said horizontal interpolation, "x" varies from 1 to a sampling point number during one horizontal line period, in the case of said vertical interpolation, "x" varies from 1 to a horizontal line number scanned during one vertical line period, and $a_i$, $b_i$, $c_i$, $d_i$ and $e_i$ are constants with respect to each of the horizontal lines where each seed point is set.

9. The method of correcting digital convergence as claimed in claim 7, wherein said step (b) comprises the steps of:

(b1) reading out the operation values using the number of a sampling point during the one horizontal line period as an address in a horizontal interpolation; and (b2) reading out the operation values using the number of a horizontal line during the one vertical line period as an address in a vertical interpolation.

10. The method of correcting digital convergence as claimed in claim 9, wherein said step (c) comprises the steps of:

(c1) multiplying the operation values read out in step (b1) by correction data of the seed points in a horizontal direction among the seed points selected in step (a), respectively, in a horizontal interpolation, and interpolating by summing the multiplied result; and (c2) multiplying the operation values read out in said step (b2) by each correction data of the seed points in a vertical direction among the seed points selected in step (a), respectively, in a vertical interpolation, and interpolating by summing the multiplied result.

* * * * *